United States Patent [19]
Lindsay

[11] 3,788,625
[45] Jan. 29, 1974

[54] ROTARY CUTTER

[76] Inventor: Harold W. Lindsay, 2480 N.W. Vaughn, Portland, Oreg. 97240

[22] Filed: Apr. 3, 1972

[21] Appl. No.: 240,697

[52] U.S. Cl............................................ 29/105 A
[51] Int. Cl............................................ B26d 1/26
[58] Field of Search..................... 29/95 B, 96, 105

[56] References Cited
UNITED STATES PATENTS
3,405,433  10/1968  Williams.............................. 29/105
3,656,220  4/1972  Dupuis............................. 29/105 X Primary Examiner—Andrew R. Juhasz
Assistant Examiner—W. R. Briggs
Attorney, Agent, or Firm—Stephen W. Blore et al.

[57] ABSTRACT

A rotary cutter for pin type carbide inserts includes peripheral, radially extending recesses in which the inserts are received. A shim is positioned in each recess adjacent the back face of the insert, the insert being retained on an integral pin on the front face of the shim and by a lip formed by a chip clearance cutout at the front of the recess. A keying lug on the back face of the shim is received in a keyway in the recess and includes a screw threadedly receivable in the cutter body, the screw serving to clamp the shim and the insert in the recess with the cutting face of the insert engaged by the lip.

2 Claims, 6 Drawing Figures

PATENTED JAN 29 1974 3,788,625

ROTARY CUTTER

BACKGROUND OF THE INVENTION

This invention relates to cutting tools in which a cutting tool holder releasably holds a replaceable cutting insert composed of an extremely hard cutting material, such as a carbide or ceramic cutter, which is discarded and replaced when dull.

Replaceable carbide inserts of the type herein concerned include those with centrally disposed apertures or bores as well as those without. Inserts having such central apertures or bores are classified as pin type inserts.

Pin type inserts have heretofore been used only in tool holders or boring bars which are cutting members adapted for attachment to a lathe or other cuttng machine. The inserts have been retained in the holders by screws or other means receivable in and coaxial with the aperture or bore in the center of the insert. Pin type inserts have not been used heretofore in rotary or milling cutters. Accordingly, it is an object of the present invention to provide a rotary or milling cutter that can utilize such pin-type replaceable cutting inserts.

Rotary or milling cutters of the prior art utilizing replaceable carbide inserts have in all cases utilized those inserts without central bores. The cutters have required wedges or shims engageable with the cutting face of the insert to clamp the same to the cutter body. The usual wedge contacts at least one-half of the front face of the insert, thereby restricting the amount of chip clearance possible. The cutting of certain metals, for example titanium, requires a greater amount of chip clearance than cutters of this type have been able to supply. Inadequate chip clearance causes excessive cutting pressures and tool breakage.

Thus, it is a further object of the present invention to provide a rotary or milling cutter which will provide a greater amount of chip clearance than has been heretofore possible.

A still further object of the present invention is to provide such a cutter that will not require a wedge or shim in contact with the cutting face of the insert to hold the same in place.

A still further object of the present invention is to provide such a rotary or milling cutter that will securely retain the replaceable insert, yet permit practically 100 percent of the insert face to be free for chip flow.

A still further object of the present invention is to provide such a cutter that will retain the replaceable insert by means of a shim engageable with the back or non-cutting face of the insert.

A still further object of the present invention is to provide such a cutter that will permit the same shim to be used with cutting inserts having both negative and positive rakes.

A still further object of the present invention is to provide such a cutter that will be inexpensive to construct.

A still further object of the present invention is to provide a shim for a rotary cutter that can be used either for right or left-hand cutters.

SUMMARY OF THE INVENTION

My rotary cutter comprises a cutter body having at least one radially extending recess in the periphery thereof. A pin-type cutting insert is disposed in such recess, the insert having a generally radially extending back face and a front face parallel to such back face and comprising a cutting edge.

Shim means are disposed in the recess adjacent the back face of the insert. Means are disposed on the front face of the shim means for retaining the insert in engagement therewith, and clamping means are further provided on the back face of the shim means for retaining the shim means and the insert within the recess.

DESCRIPTION OF THE PREFERRED EMBODIMENT

Figure 1:
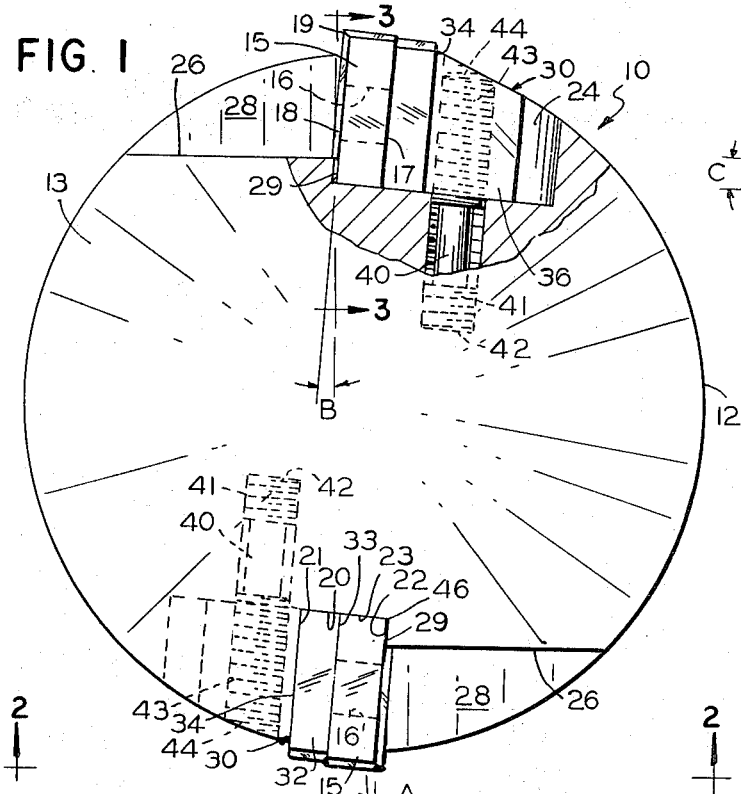
FIG. 1 is a top view, drawn approximately twice size, of a rotary cutter constructed in accordance with the present invention.

Referring to the drawings, a cutting tool forming one embodiment of the present invention is illustrated in the form of a rotary or milling cutter 10 having a shank 11 terminating in a cylindrical head 12 whose work-facing surface 13 is disposed generally perpendicularly to the longitudinal axis 14 of the tool. The cutter 10 is illustrated as being rotatable about its longitudinal axis 14, although it will be understood that cutting tools according to the present invention may not always be rotatable.

The cutter 10 herein illustrated is designed to accommodate, for example, two conventional replaceable carbide or ceramic inserts 15 of the pin type. Each such insert 15 has a central bore 16, a back side or back face 17 and a front side or cutting face 18 comprising a cutting edge 19.

The cutter head 12 is dished as shwon and is provided with two peripheral, generally radially extending recesses 20, each having a generally radially extending back wall 21, a front wall 22 parallel to the back wall 21 and a generally axially extending bottom wall 23. A keying portion or keyway 24 extends inwardly or rearwardly from the back wall 21 of the recess 20.

A generally chordal cutout 26 is formed in the head 12 extending forwardly of the front wall 22 of the recess 20 (that is, in a direction opposed to the keyway 24), the cutout 26 being formed with a circular cut 27 to form a bottom 28 merging with the back wall 21 of the recess. The construction provides a radially extending lip 29 on the front wall 22 of the recess, the lip 29 serving to retain the insert 15 in a manner hereinafter to be described.

Figure 2:
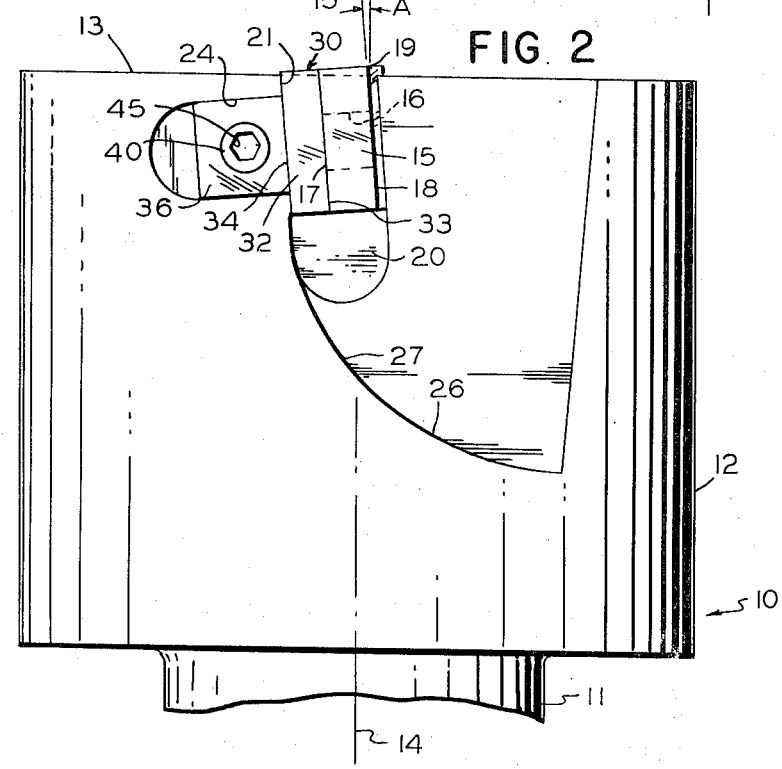
FIG. 2 is a side view of the cutter taken on line 2—2 of FIG. 1.
Figure 3:
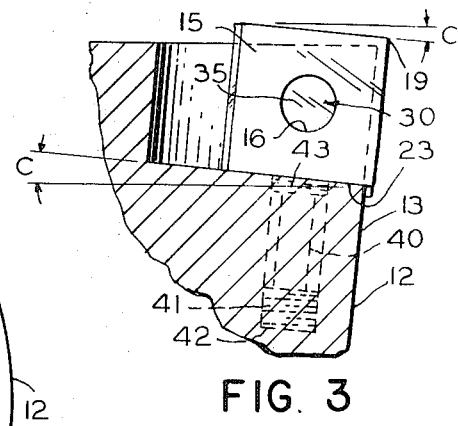
FIG. 3 is a partial sectional view taken on line 3—3 of FIG. 1.
Figure 4:
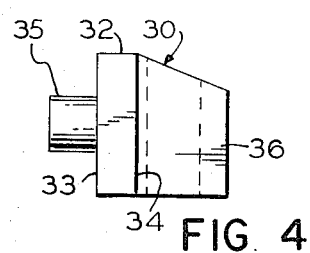
FIG. 4 is a side elevational view of the shim used in the cutter.
Figure 5:
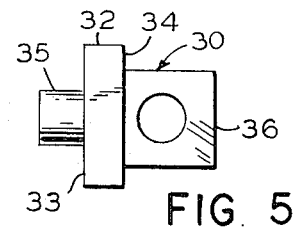
FIG. 5 is a top plan view of the shim of FIG. 4.
Figure 6:
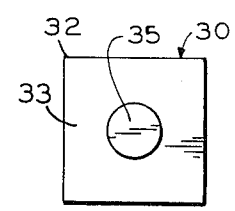
FIG. 6 is a face view of the shim.

The recesses 20 are constructed such that they provide, for example, a 5° negative axial rake A (see FIG. 2), a 5° negative radial rake B (see FIG. 1), and a 5° lead C, for example, on a square insert (see FIG. 3).

A shim 30 is removably disposed within each of the recesses 20. Each such shim 30 comprises a generally rectangular block 32 having a front side or face 33 and a back side or face 34 parallel thereto. A centrally disposed integral pin 35 extends forwardly or generally circumferentially of the front face 33 for engagement with the aperture or central bore 16 of the insert 15, and a symmetrical keying lug 36 extends rearwardly of the back face 34 for engagement with the keyway 24.

The lug 36 is provided with a generally radially extending screw 40 having a right hand thread 41 at its inner extremity 42 and a left-hand thread 43 at its outer extremity 44. The inner extremity 42 is threadedly received within the head 12, while the outer extremity 44 is threadedly received within the keying lug 36. The screw 40 is also provided with an internal wrenching socket 45 in its outer extremity 44, whereby rotation of the screw in the clockwise direction simultaneously engages the thread 41 into the head 12 and draws or clamps the shim 30 radially into the recess 20.

As can be seen from the drawings, the insert 15 is received on the pin 35 of the shim 30, the back side or face 17 of the insert engaging the front side or face 33 of the shim and the back side or face 34 of the shim abutting the back wall 21 of the recess 20. No other wedge or shim is required to engage the front side or face 18 of the insert.

The chordal width of the recess 20 is equal to the thicknesses of the insert 15 and the block 32 of the shim 30 so as to form the equivalent of a pocket 46 therefor. Tightening the screw 40 thus forces the shim 30 radially inwardly of the cutter head 12, drawing the insert 15 received on the pin 35 together with the shim 30 into such pocket. The insert 15 and block 32 of the shim 30 bottom together in the recess 20, the insert 15 being held radially by the pin 35, and the front side or cutting face 18 engaging and being retained by the lip 29. I have found that satisfactory retention of the insert is achieved when the depth of the pocket 46 (height of the lip 29) is only 1/16 inch, the lip 29 preventing circumferential tipping of the insert while the block 32 provides circumferential support. Axially, the insert 15 is maintained in position solely by the pin 35, the shim 30 itself being held axially in position by the axially symmetrical lug 36 in the keyway 24.

The combination of the pin 35 and the pocket 46 formed by the lip 29 permits the insert 15 to be held in the cutter body 12 without any wedge or shim engaging its front face 18. Eliminating such a front-face engaging wedge permits a great deal of chip clearance to be achieved, as can be seen from the extent of the chip clearance cutout 26. The extent of such clearance can be appreciated by noting that the usual front-face engaging wedge contacts at least one-half of the insert face, whereas eliminating the wedge in the instant construction permits practically 100 percent of the cutting face of the insert 15 to be free for chip flow.

The shim 30 is relatively inexpensive to construct inasmuch as it requires no recess in which to seat the insert 15. The only requirement is that the pin 35 be centrally disposed on the face 33 and that the lug 36 be symmetrically in the axial direction with respect to the face 34. Obviously, the bottom walls 23 of the recesses 20 which form the pockets 46 must all be the same radial distance from the axis 14 of the tool. It will be further noted that use of a symmetrical lug 36 on the shim permits the same shim to be used either for right-hand or left-hand cutters.

The construction permits the same shim 30 to be used for negative, 50° positive and 15° positive cutting inserts, whereas prior cutters required changing the shim to handle such different inserts. Thus, both construction and use of the cutter are made relatively inexpensive.

I claim:
1. In a cutter,
a cutter body having at least one recess extending inwardly of the periphery thereof, said recess having an inwardly extending back wall and a front wall parallel thereto, said back and front walls defining a bottom to said recess therebetween;
said recess having a keyway extending inwardly of said cutter body from said back wall thereof;
said body having a further cutout extending from said front wall of said recess in a direction opposed to said keyway, said cutout meeting said front wall of said recess to form a lip therewith;
a shim disposed in said recess and having a back side abutting said back wall thereof and being supported thereby, said shim having a front side parallel to said back side, said shim having a key projecting from said back side thereof and fitting closely in said keyway, said shim having a pin extending from said front side thereof;
a cutter insert received in said recess, said insert having a front face with a cutting edge and being provided with a central aperture, said insert being received on said pin, said insert having a back face engaging said front side of said shim and being supported thereby, said front face of said insert engaging said lip, said width of said recess being equal to the thicknesses of said shim and said insert; and
screw means disposed in said key for moving said shim and said insert inwardly of said cutter body to force said shim and said insert into said recess and engage said front face of said insert with said lip.
2. A cutter as in claim 1 wherein said key is symmetrically disposed with respect to said back side of said shim.

* * * * *

UNITED STATES PATENT OFFICE
CERTIFICATE OF CORRECTION

Patent No. 3,788,625　　　　　　Dated January 29, 1974

Inventor(s) HAROLD W. LINDSAY

It is certified that error appears in the above-identified patent and that said Letters Patent are hereby corrected as shown below:

Column 1, line 16, "cuttng" should be --cutting--;

Column 2, line 42, "shwon" should be --shown--; and

Column 4, line 11, "50°" should be --5°--.

Signed and sealed this 9th day of April 1974.

(SEAL)
Attest:

EDWARD M. FLETCHER, JR.　　　　　　C. MARSHALL DANN
Attesting Officer　　　　　　　　　Commissioner of Patents